United States Patent [19]

Scholz et al.

[11] 4,064,218

[45] Dec. 20, 1977

[54] REMOVAL OF PHOSGENE FROM OFF-GASES

[75] Inventors: Heinrich Scholz, Heidelberg; Martin Decker, Ludwigshafen; Franz Neumayr, Weisenheim, all of Germany

[73] Assignee: BASF Aktiengesellschaft, Ludwigshafen, Germany

[21] Appl. No.: 697,770

[22] Filed: June 21, 1976

[30] Foreign Application Priority Data

July 15, 1975 Germany .............................. 2531545

[51] Int. Cl.² ............................................. B01D 53/34
[52] U.S. Cl. .................................. 423/240; 423/420; 423/470

[58] Field of Search ............... 423/240, 241, 245, 481, 423/488, 420, 470

[56] References Cited

U.S. PATENT DOCUMENTS

| 3,142,535 | 7/1964 | Christoph, Jr. .................. 423/240 X |
| 3,314,753 | 4/1967 | Richert et al. .................... 423/240 X |
| 3,376,113 | 4/1968 | Frevel et al. .......................... 423/240 |
| 3,411,867 | 11/1968 | Beech et al. .......................... 423/240 |

*Primary Examiner*—Earl C. Thomas
*Attorney, Agent, or Firm*—Keil, Thompson & Shurtleff

[57] ABSTRACT

Process for the removal of phosgene from an off-gas in which it is present in small quantities, by washing with an aqueous solution of alkali and ammonia.

4 Claims, No Drawings

REMOVAL OF PHOSGENE FROM OFF-GASES

Phosgene ($COCl_2$) is used in a large number of chemical processes as a chlorinating agent for the manufacture of, e.g., chloroformic acid esters, carbamoyl chlorides, isocyanates and carbonic acid esters.

Phosgene, when used as an agent for introducing chlorine, assumes a preferred position over other chlorinating agents. Whereas the use of other conventional chlorinating agents such as thionyl chloride or phosphorus chloride leads to the formation of environmentally undesirable waste products (off-gases containing sulfur dioxide and waste water containing phosphoric acid), reactions with phosgene merely lead to the formation of carbonic acid and recoverable hydrogen chloride. However, phosgene is a relatively stable substance so that the aforementioned manufacturing processes usually produce residual gases or off-gases from which the very poisonous phosgene must be removed or destroyed to the limit of detectability.

Off-gases frequently occur which contain, in addition to large amounts of hydrogen chloride, small amounts of phosgene, as in the manufacture of chlorocarbonic acid esters for example. Whereas hydrogen chloride may be relatively easily washed out with water, the removal of small amounts of phosgene is particularly difficult.

The basic method is to remove the major portion of the phosgene by refrigeration and separation of the liquefied phosgene, whereupon the hydrogen chloride is washed out and the residual phosgene is decomposed by a chemical reaction.

Despite statements to the contrary (U.K. Pat. No. 737,442), it is not possible to remove phosgene by refrigeration alone to the physiologically acceptable limit ("maximum concentration in the work area" value 0.1 ppm), unless temperatures or process arrangements are to be used which economical considerations forbid.

A number of processes for the decomposition of small amounts of phosgene have been proposed or are in use. However, these processes are either inadequately effective and do not remove the phosgene to below the limit of detectability or they use a disproportionately large amount of chemicals and apparatus.

For example, in the process of German Pat. No. 961,681 the off-gas is passed through a tower filled with activated charcoal which is countercurrently irrigated by dilute aqueous hydrochloric acid. In this process the phosgene is not completely removed and the activated charcoal must be regenerated very frequently.

According to the process disclosed in U.S. Pat. No. 3,376,113, phosgene is decomposed with water in contact with alumina catalysts. The drawback of this method is its slow reaction rate. Moreover, it requires further removal of hydrogen chloride, i.e., an additional washing operation.

Another method used commercially involves the reaction of phosgene-containing gases with aqueous alkali (i.e., activated water). However, considering the amount of apparatus required, this method suffers from an unduly slow reaction rate.

A laboratory method of removing phosgene in small quantities from off-gases consists in washing the off-gases with aqueous ammonia. For economical reasons, this method is not possible on a commercial scale.

It is an object of the present invention to provide a method of removing small amounts of phosgene from off-gases by economically acceptable means.

We have found that this object is achieved by treating the off-gases with aqueous caustic solution containing a minor amount of ammonia.

This process simultaneously destroys any chlorine compounds still present and is therefore particularly advantageous.

The use of a compound from which ammonia may be liberated by caustic alkali is equivalent to the use of ammonia itself. Caustic potash or caustic soda may be used, the latter being recommended for economical reasons.

We believe that substantially the following reactions take place:

Ammonia or $NH_4OH$ reacts rapidly with phosgene to form ammonium chloride and ammonium carbonate which presumably (when caustic soda is used) are in turn converted to sodium chloride and soda, whilst ammonia is reformed. Ammonium carbonate and ammonium dicarbonate have been found to have the same effect as ammonia itself, whereas ammonium chloride alone, i.e., in the absence of caustic alkali, is not effective. It is worthy of mention that the sodium carbonate finally formed has no detrimental effect on the washing process. The caustic alkali is thus utilized to a high degree.

The above considerations are based, inter alia, on the results of comparative speed measurements in a gas burette which have shown that even very dilute aqueous ammonia solutions (for example from 0.1 to 2% ammonia solutions) effect decomposition of phosgene at a rate which is up to 4 times higher than that achieved by 10% caustic soda solution.

The facts concerning the effectiveness of ammonium bicarbonate or ammonium carbonate on the one hand and the ineffectiveness of sodium carbonate on the other hand are of decisive importance when considering the value of the process of the invention, since the off-gases from phosgene reactions often contain large amounts of carbon dioxide. Whereas, in the decomposition of phosgene with caustic soda alone, the latter binds the carbon dioxide to virtually ineffective sodium bicarbonate or sodium carbonate, thus making a large excess of caustic soda necessary, ammonia, ammonium carbonate and ammonium bicarbonate remain fairly effective even in the presence of large amounts of soda and low concentrations of caustic soda. Due to the differences in basicity, the sodium bicarbonate initially formed in the presence of large amounts of carbon dioxide is capable of liberating ammonia from the ammonium chloride, which is ineffective in itself, which ammonia is then available for the reaction in the manner of the invention.

The process of the invention permits the use of temperatures of from, say, 10° to 100° C, at atmospheric pressure, or higher, at appropriate pressures. The process is conveniently carried out at from 40° to 60° C.

The slightly elevated temperature assists the liberation of further ammonia from urea, carbamates, acid amides and alkyl ureas which may be formed by decomposition of the organic chlorine compounds contained in the off-gas and possibly containing nitrogen. This is particularly important in the case of processes serving to produce, say, carbamic esters or isocyanates. Urea and its derivatives would seem to be independently capable of decomposing phosgene, but this is of less significance for the invention, since these compounds produce ammonia with caustic alkalis.

The alkaline wash liquid may contain, say, from 1 to 50% of NaOH or KOH and is advantageously circulated through a scrubber which may be packed or provided with baffles. Fresh caustic solution is added as the pH demands. Ammonia is theoretically required in catalytic amounts only and may be recovered in the free form or as the carbonate by heating solution bled from the loop. It may then be reused. If recovery of the ammonia is not required, the ammonia contained in the spent solution must be returned to the loop in the form of makeup ammonia. The steady concentration of ammonia in the wash liquid is from, say, 0.1 to 10% and advantageously from 0.5 to 5%, by weight (or an amount of compounds of ammonia effective in producing such ammonia concentrations). The effect, i.e. improvement in the reaction rate as opposed to the use of NaOH alone, is evident at low ammonia concentrations, and it will be appreciated that, from a purely chemical point of view, higher concentrations of ammonia may be used. Using a conventional packed scrubber, it is recommended that the rate of flow of the liquid be, for example, from 1 to 50 $m^3/m^2.hr$, based on the empty scrubber. The gas rate may be, for example, from 5 to 200 $m^3/m^2.hr$ and may clearly be varied within wide limits.

EXAMPLE

The off-gas rate of a production plant which may be used alternatively for the production of chloro formates, acid chlorides, alkyl chlorides and carbamide acid chlorides is from 80 to 150 $m^3/hr$. In one case, for example, the off-gas has the following composition:

phosgene: 6.1 – 8.0% v/v
organic chlorine compounds: 1.6 – 3.3% v/v
hydrogen chloride: 24 – 38 % v/v
carbon dioxide: 2 – 22 % v/v
nitrogen: 39 – 44 % v/v The purifying plant consists, in all, of 3 scrubbers through which the off-gas is passed cocurrently with the wash liquid. The first wash serves to remove the major amount of the HCl present. Water is passed through the first scrubber at a rate of from 20 to 40 $m^3/m^2.hr$ in order to remove as much of the hydrogen chloride from the off-gas as possible. The off-gas now virtually free from hydrogen chloride, is then passed through the second scrubber through which an aqueous solution containing 5% of NaOH and 1% of $NH_3$ is circulated at a rate of from approximately 5 to 10 $m^3/m^2.hr$. Fresh caustic soda solution is added to the loop as required to maintain a pH of about 8.

The ammonia is recovered from the overflow of the loop by distillation of a small portion of the spent wash water, and the ammonia thus obtained as overhead is returned to the loop. The amount of fresh ammonia required for replenishment is thus negligibly small.

Following the treatment in the second scrubber, the off-gas passes through a third scrubber in which traces of ammonia absorbed by the off-gas are removed by washing.

The concentration of undesirables in the off-gas on leaving the purifying plant is below the threshold of detectability.

We claim:
1. A process for removing phosgene from off-gas which comprises washing the off-gas with an aqueous solution containing from 1 to 50% by weight of sodium hydroxide or potassium hydroxide and from about 0.1 to 10% by weight of ammonia, said washing step being carried out at a temperature of from about 10° to 100° C.

2. A process as set forth in claim 1 wherein the amount of ammonia in the solution is from about 0.5 to 5% by weight.

3. A process as set forth in claim 2 wherein the temperature of the washing step is from about 40° to 60° C.

4. A process as set forth in claim 1, in which the treatment is carried out in a packed column or a column provided with baffles.

* * * * *